Jan. 22, 1946.   E. C. CROWTHER   2,393,519
CASTELLATED NUT
Filed Dec. 27, 1943

INVENTOR
Edmond C. Crowther
BY
ATTORNEYS.

WITNESS:

Patented Jan. 22, 1946

2,393,519

UNITED STATES PATENT OFFICE 2,393,519

CASTELLATED NUT

Edmond C. Crowther, Philadelphia, Pa., assignor to Illinois Tool Works, Chicago, Ill., a corporation of Illinois Application December 27, 1943, Serial No. 515,791

4 Claims. (Cl. 151—5)

This invention relates to an improvement in castellated nuts.

Heretofore castellated nuts have been well known and widely used where it has been desired to fix or lock a nut against turning off by means of a cotter pin passed through a hole in the bolt.

Castellated nuts as heretofore produced have been formed in one piece, the castellation being formed or cut from one face of the nut. As a consequence the forming steps involved have been relatively expensive relative to the procedure required for the formation of the ordinary plain nut; and unnecessary material has been required since the castellations, to fairly perform their function, are not required to be of a strength comparable to that of the body of the nut.

Now in accordance with this invention, a castellated nut is provided which will possess in use effectively all of the advantages of the well known one piece castellated nut and, at the same time, will be of a construction enabling it to be produced at a large saving in cost from the standpoint of labor and material.

Having now indicated, in a general way, the nature and purpose of this invention, I will proceed to a detailed description of preferred embodiments thereof with reference to the accompanying drawing, in which.

Figure 2:
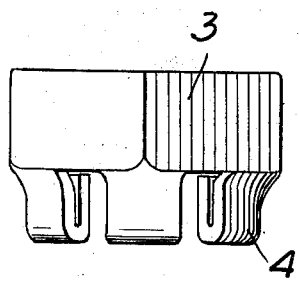
Figure 2 is a view of an element of the structure shown in Figure 1.
Figure 1:
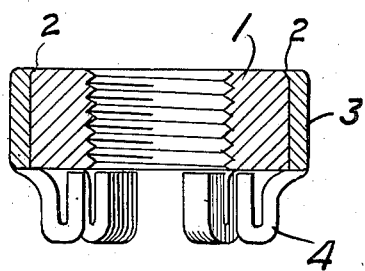
Figure 1 is a sectional view of a castellated nut embodying this invention.
Figure 3:
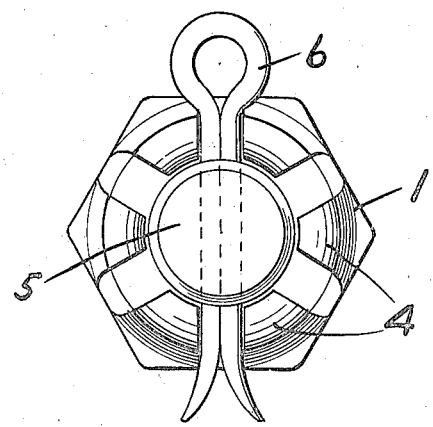
Figure 3 is a top view of the nut shown in Figure 1, assembled with a bolt and a cotter pin.

Referring more particularly to Figures 1–3, an ordinary threaded hex nut is indicated by the reference character 1. The nut 1 is desirably champhered adjacent its free face as at 2, and, if desired, the nut may be of the double champhered type.

Conforming closely to the nut 1 is a relatively thin shell 3, which may be made by stamping and drawing from any suitable metal, as a light steel, or an alloy. The shell 3 has spaced extensions or fingers extending from one of its ends beyond a face of the nut 1 and which are bent upon themselves to form castellations 4, as shown, for example, in Figure 1 and 2. The extensions forming the castellations desirably extend from shell 3 at the corners formed by its faces, which conform with the faces of the hex nut 1, as shown in Figure 2.

The shell 3 conforms with the thickness of the nut 1 and with the periphery thereof and is made unitary with the nut by swaging it into the champhers 2 adjacent one face of the nut and bending or swaging the castellations 4 at their juncture with the shell in over the other face of the nut, as is clearly shown in Figure 1.

If the nut 1 be of the double champhered type, the castellations will be also bent into the champhers.

In use of the nut shown in Figure 1, it will be applied to a bolt 5 and fixed or locked by means of a cotter pin 6 passed through a hole in the bolt 5 and extending between a pair of diametrically disposed castellations 4 on opposite sides of the bolt.

Figure 4:
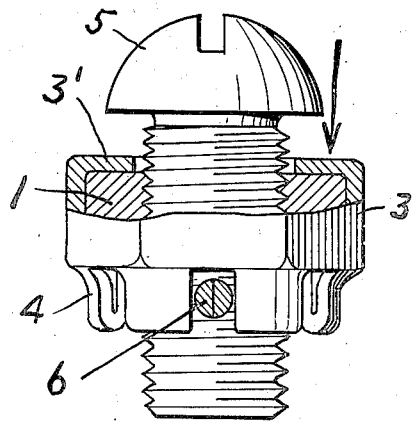
Figure 4 is a view, partly in section, showing a modified form of this invention as shown in Figures 1–3.
Figure 5:
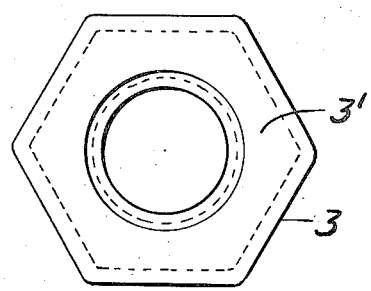
Figure 5 is a view of the modified form of nut shown in Figure 4, looking in the direction of the arrow, Figure 4.

As shown in Figures 4 and 5, the structure shown in Figures 1–3 may be modified by forming the shell 3 cup shaped with an annular flange 3' adapted to engage with a face of the nut 1, the shell and nut being rendered unitary by bending or swaging the castellations in over the opposite face of the nut, as in the structures shown in Figures 1–3.

It will be appreciated that the above detailed description of embodiments of this invention is for illustrative purposes and is not intended to be in limitation of the scope of the invention or of the claims appended hereto.

What I claim and desire to protect by Letters Patent is:

1. In combination, a nut, a shell conforming to the periphery of the nut and in contact with the faces thereof, one end of the shell being swaged over the end portion of the nut, the other end of the shell having spaced members bent inwardly over the opposite end of the nut to fixedly hold the nut in the shell, there being oppositely disposed recesses between the spaced members, for the reception of a cotter passed diametrically across the opening in the nut.

2. In combination, a nut, a shell conforming to the periphery of the nut and in contact with the faces thereof, one end of the shell being swaged over the end portion of the nut, the other end of the shell having spaced members bent inwardly over the opposite end of the nut to fixedly hold the nut in the shell, said spaced members then being bent upon themselves, there being oppositely disposed recesses between the spaced members, for the reception of a cotter passed diametrically across the opening in the nut.

3. In combination, a nut, a shell conforming to the periphery of the nut and in contact with the faces thereof, a plurality of annularly disposed, circumferentially spaced portions of said shell extending beyond one end of the nut and bent back upon themselves so as to provide pairs of U-shaped edges adapted to engage a cotter-pin passed diametrically across the opening in the nut, and means for securing the nut and shell against axial separation.

4. In a castellated nut device a shell having a body portion conforming in shape with that of a conventional nut and providing an inner chamber for accommodating a nut, said shell presenting a plurality of circumferentially spaced portions extending from one end of the shell beyond the area normally occupied by a nut and bent back upon themselves so as to provide pairs of U-shaped edges adapted to engage a cotter-pin passed diametrically across the opening in the nut.

EDMOND C. CROWTHER.